United States Patent
Lloyd et al.

(10) Patent No.: US 12,505,903 B1
(45) Date of Patent: Dec. 23, 2025

(54) SYSTEMS AND METHODS TO FACILITATE STORAGE AND/OR RETRIEVAL OF HEALTHCARE INFORMATION

(71) Applicant: Redox, Inc., Madison, WI (US)

(72) Inventors: James Lloyd, Madison, WI (US); Christopher Tobin-Campbell, Madison, WI (US); Nicholas W. Hatt, Madison, WI (US); Nijay Patel, Madison, WI (US); Andrew Kitson, Madison, WI (US); Luke Turner, Silverdale, WA (US)

(73) Assignee: Redox, Inc., Madison, WI (US)

( * ) Notice: Subject to any disclaimer, the term of this patent is extended or adjusted under 35 U.S.C. 154(b) by 995 days.

(21) Appl. No.: 15/905,131

(22) Filed: Feb. 26, 2018

(51) Int. Cl.
*G16H 10/60* (2018.01)
*G16H 80/00* (2018.01)

(52) U.S. Cl.
CPC ............ *G16H 10/60* (2018.01); *G16H 80/00* (2018.01)

(58) Field of Classification Search
CPC .............................. G16H 10/60; G16H 80/00
See application file for complete search history.

(56) References Cited

U.S. PATENT DOCUMENTS

| | | | |
|---|---|---|---|
| 5,546,580 A | 8/1996 | Seliger | |
| 7,752,035 B2 | 7/2010 | Oon | |
| 8,000,984 B2 | 8/2011 | Hasan | |
| 8,260,635 B2 | 9/2012 | Hasan | |
| 8,468,033 B2 | 6/2013 | Gunn | |
| 8,756,613 B2 | 6/2014 | Hosie | |
| 8,850,057 B2 | 9/2014 | Natoli | |
| 9,137,166 B2 | 9/2015 | Lee | |
| 9,973,455 B1 | 5/2018 | Fowler | |
| 10,007,566 B1 | 6/2018 | Sweetland | |
| 10,937,553 B2 | 3/2021 | Rego | |
| 2001/0053986 A1 | 12/2001 | Dick | |
| 2004/0068545 A1 | 4/2004 | Daniel | |
| 2005/0138210 A1 | 6/2005 | Shkvarchuk | |
| 2007/0016450 A1 | 1/2007 | Bhora | |
| 2007/0118601 A1 | 5/2007 | Pacheco | |
| 2007/0257786 A1 | 11/2007 | King | |
| 2008/0046292 A1 | 2/2008 | Myers | |
| 2008/0148282 A1 | 6/2008 | Sodani | |
| 2009/0222283 A1 | 9/2009 | Lassetter | |

(Continued)

OTHER PUBLICATIONS

Evans RS, Electronic Health Records: Then, Now, and in the Future, Published May 20, 2016, Med Inform. 2016; Suppl 1(Suppl 1): S48-S61. doi:10.15265/YS-2016-s006 (Year: 2016).

*Primary Examiner* — Gregory D. Moseley
(74) *Attorney, Agent, or Firm* — Esplin & Associates, PC

(57) ABSTRACT

Described herein are systems and methods to facilitate storing and/or retrieval of healthcare information. Healthcare information may include transactional information. The transactional information may be in the form of messages communicated between healthcare entities and vendor entities. The messages may define events. An event may involve a subject and one or more assets. The status of one or more of the events, the subjects, and/or the assets may be extracted from the messages and stored in a database. The healthcare entities and/or vendor entities may query the database to retrieve the status one or more of the events, the subjects, and/or the assets.

20 Claims, 3 Drawing Sheets

(56) References Cited

U.S. PATENT DOCUMENTS

| | | | |
|---|---|---|---|
| 2010/0169263 A1* | 7/2010 | Korpman | G16H 10/60 706/50 |
| 2011/0106564 A1 | 5/2011 | Hachmeister | |
| 2011/0119088 A1 | 5/2011 | Gunn | |
| 2012/0215860 A1* | 8/2012 | Bohner | G16H 10/60 709/206 |
| 2014/0297321 A1 | 10/2014 | Adams | |
| 2014/0337051 A1* | 11/2014 | Karpf | G16Z 99/00 705/3 |
| 2015/0310176 A1 | 10/2015 | Chen | |
| 2015/0332011 A1 | 11/2015 | Ting | |
| 2016/0063191 A1 | 3/2016 | Vesto | |
| 2017/0043089 A1 | 2/2017 | Handler | |
| 2017/0103163 A1 | 4/2017 | Emanuel | |
| 2017/0201556 A1 | 7/2017 | Fox | |
| 2018/0067864 A1 | 3/2018 | Park | |
| 2018/0113979 A1 | 4/2018 | McCondochie | |
| 2019/0221296 A1 | 7/2019 | Lloyd | |
| 2020/0066392 A1 | 2/2020 | Bess | |
| 2020/0111549 A1 | 4/2020 | Lloyd | |
| 2020/0152337 A1 | 5/2020 | Rego | |

* cited by examiner

SYSTEMS AND METHODS TO FACILITATE STORAGE AND/OR RETRIEVAL OF HEALTHCARE INFORMATION

FIELD

The disclosure relates to systems and methods to store electronic health records.

BACKGROUND

Healthcare entities and third parties vendors often communicate in order to carry out and/or facilitate various healthcare related services.

SUMMARY

The disclosure relates to systems and methods configured to facilitate storage and/or retrieval of healthcare information. The healthcare information may include information derived from transactional information and/or other information. The transactional information may include information exchanged between different parties within a given healthcare entity, between multiple healthcare entities, between a healthcare entity and a third party, between a healthcare entity and multiple third parties, and/or other information.

The transactional information may be in the form of messages. In some implementations, message content of the messages may include, involve, and/or refer to other healthcare information (e.g., patient identification information, electronic health records, and/or other information). The message content of an individual message may define one or more events. An event may include a transaction or exchange that describes a subject's involvement with one or more healthcare entities for the purpose of treating the subject. The involvement may include one or more of past, present, and/or future involvement. More specifically, an event may involve an individual subject being treated and one or more assets of one or more healthcare entities that may be utilized during the treatment. The transactional information may be analyzed to ascertain the events described therein, the subjects involved, the assets involved, and/or other information. The status of these events, subjects, and/or assets may comprise the information which is stored and made retrievable.

In some implementations, a system configured to facilitate storage and/or retrieval of healthcare information may include one or more of: one or more servers, one or more client computing platforms, one or more healthcare entities, one or more vendor entities, and/or other components. The one or more servers may be configured to communicate with one or more client computing platforms according to a client/server architecture. The one or more servers may including one or more physical processors configured to execute one or more computer program components. The computer program components may include one or more of an message component, a transformation component, an extraction component, a storage component, a query component, a results component, and/or other components.

The message component may be configured to obtain messages communicated from a healthcare entity to one or more vendor entities. An individual message may include message content. The message content of an individual message may define one or more events, and/or other information. An individual event may involve an individual subject, one or more assets of the healthcare entity, and/or other entities. The message content of the individual message may be configured in a medical record format customized by, and specific to, the healthcare entity.

The transformation component may be configured to transform the message content of the messages from the medical record formats to a healthcare entity-independent format.

The extraction component may be configured to ascertain, from the message content of the messages transformed to the healthcare entity-independent format, individual events defined in the message content of the messages. Ascertaining the events may include one or more of ascertaining the individual subjects involved in the individual events, the one or more assets involved in the individual events, and/or other information.

The storage component may be configured to effectuate storage of information records. The information records may include one or more of event records, subject records, asset records, and/or other records. The event records may define status of individual events. The subject records may define status of individual subjects of the individual events. The asset records may define status of individual assets of the individual events. The statuses of one or more of the individual events, the individual subjects of the individual events, and/or the individual assets of the individual events may be determined from the message content of the messages.

The query component may be configured to obtain search queries. The individual search queries may specify one or more of a specific event, a specific subject, a specified asset, and/or other information.

The results component may be configured to effectuate presentation of results of the search of the information records on one or more computing platforms. The results may include the status of one or more of the specific event, the specific subject, and/or the specific asset specified in the individual search queries.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
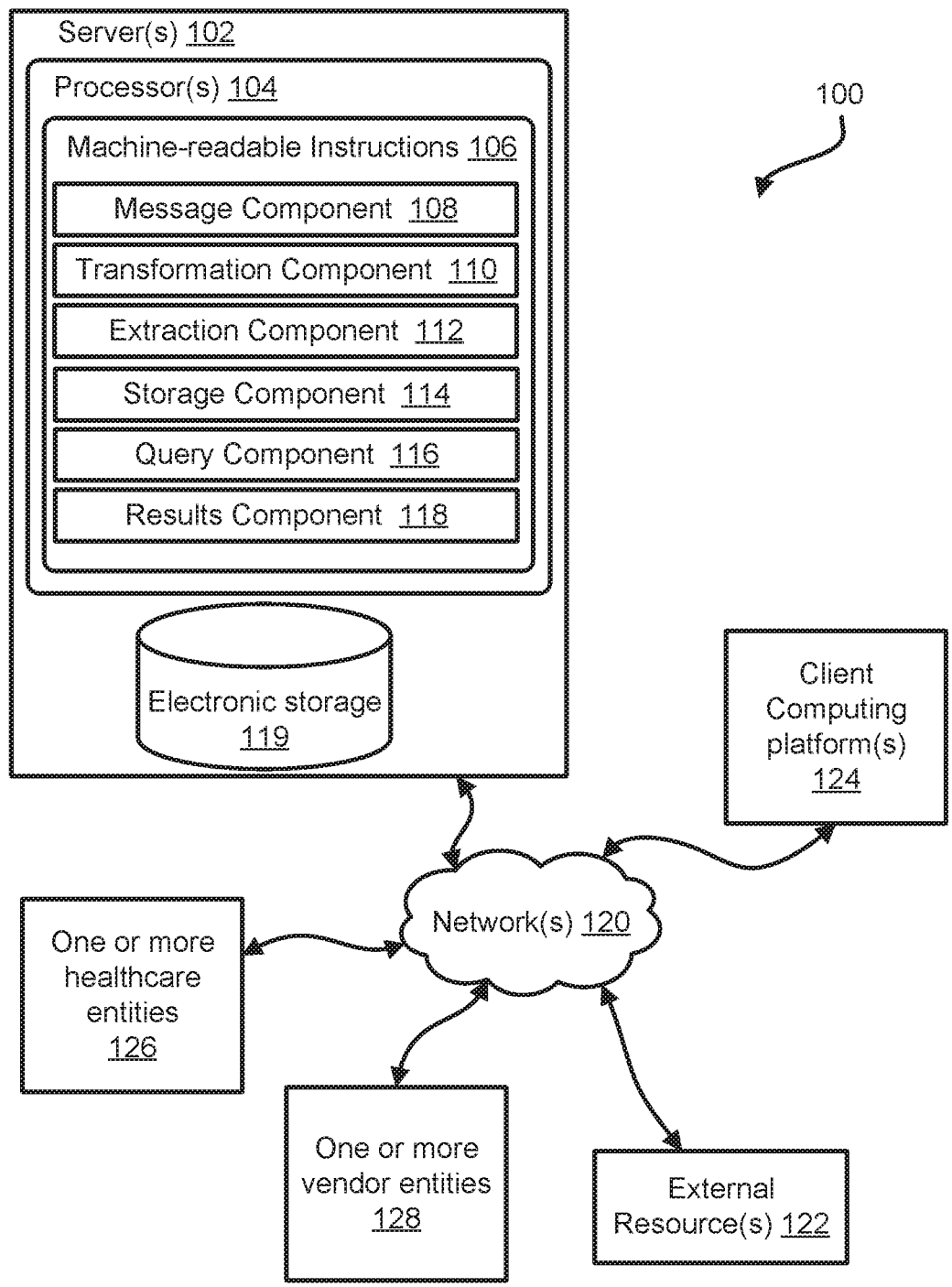
FIG. 1 illustrates a system configured to facilitate storage and/or retrieval of healthcare information, in accordance with one or more implementations.

FIG. 1 illustrates a system 100 configured to facilitate storage and/or retrieval of healthcare information, in accordance with one or more implementations. In some implementations, healthcare information may include a wide variety of information related to one or more of healthcare entities, patients who utilize healthcare entities, and/or other information. The healthcare information may include information derived from transactional information and/or other information. The transactional information may include information exchanged between different parties within a given healthcare entity, between multiple healthcare entities, between a healthcare entity and a third party, between a healthcare entity and multiple third parties, and/or other information. It is noted that the terms "patient" and "subject" may be used interchangeably herein.

Healthcare entities may include an entities who provide and/or facilitate healthcare related services. Healthcare entities may include one or more of medical offices, hospitals, medical labs, public healthcare agencies, and/or other entities.

Third parties may interact with healthcare entities. The third parties may include vendors who provide services that may be supplemental to and/or additional to services provided by the healthcare entities. A vendor may be referred to as a "vendor entity." A vendor entity may include one or more of an insurance company, a pharmacy, and/or other service providers that may communicate and/or interact with healthcare entities.

Healthcare entities may exchange information (e.g., transactional information in the form of messages) with vendor entities in order to facilitate the services provided by either, or both, parties. The exchange may be provided via a real-time, publish-subscribe architecture. By way of non-limiting illustration, messages related to patient scheduling may be communicated when an appointment is scheduled, cancelled, and/or modified. With this type of exchange architecture, it may be up to the system of the receiving third parties to identify the relevant information from these messages in order to reconstruct the content of the message in a way that is usable to them. This can often be difficult and/or error-prone. Accordingly, the systems and methods presented herein propose storing healthcare information (e.g., transactional information and/or other information) exchanged between parties in a searchable storage or database. This may take the burden of identifying and/or reconstructing the relevant information off the third party vendor entities. Instead, the vendor entities may simply query the database as needed.

The healthcare information may include one or more of electronic health records, information records derived from transactional information, and/or other information. Electronic health records may include one or more of patient identification information, patient health information, and/or other information. The patient identification information may include information used to identify individual subjects. The patient identification information may include one or more of patient identifiers, patient name, patient sex, and/or other information. The patient health information may include one or more of administrative and/or billing information, patient demographics, progress notes, vital signs, medical histories, diagnoses, medications, immunization dates, allergies, radiology images, lab and test results, and/or other information.

Transactional information may include information exchanged between parties within a healthcare entity, between multiple healthcare entities, between a healthcare entity and a third party, and/or other information. The information may be exchanged between parties and/or entities via messages. The messages may include message content which includes the transactional information. In some implementations, the message content may include, involve, and/or refer to other healthcare information (e.g., patient identification information, electronic health records, and/or other information). By way of non-limiting illustration, message content of an individual message may define one or more events. An event may include a transaction or exchange that describes a subject's involvement with one or more healthcare entities for the purpose of treating the subject. The involvement may include one or more of past, present, and/or future involvement. More specifically, an event may involve an individual subject being treated and one or more assets of one or more healthcare entities that may be utilized during the treatment. The transactional information may be analyzed to ascertain the events described therein, the subjects involved, the assets involved, and/or other information. These events, subjects, and/or assets may be described in information records which are stored and made searchable.

An asset of a healthcare entity may describe an offering that a healthcare provides to its' patients. An asset may include one or more of services provided to patients, resources utilized by patients, and/or other assets. An asset may be classified by type. The asset types may be further classified by sub-type. The asset types may include one or more of a resource type, a services type, and/or other types.

A resource type asset may include physical resources available within a healthcare facility and/or other assets. For example, resource type assets may include one or more of personnel that interact with patients (e.g., doctors, nurses, specialists, etc.), equipment used to treat patients (e.g., CT scanner, respirator, etc.), depletable resources used during patient treatment (e.g., drugs, food, etc.), facilities in which treatment takes place (e.g., recovery room, emergency room, operating room, etc.), and/or other assets. The resource type assets may be further classified by subtype. The subtypes may include one or more of personnel subtype, equipment subtype, depletable resource subtype, facility subtype, and/or other subtypes. For example, doctors, nurses, specialists, and/or other personnel may be categorized as a resource type asset of the personnel subtype. A CT scanner, respirator, and/or other equipment may be categorized as a resource type asset of the equipment subtype. Drugs, food, and/or other depletable resources may be categorized as a resource type asset of the depletable resource subtype. A recovery room, emergency room, an operating room, and/or other facilities may be categorized as a resource type asset of the facility subtype.

A services type asset may include intangible services available within a healthcare facility and/or other assets. For example, a services type asset may include one or more of a scheduling service, a drug prescription service, and/or other services. The services type assets may be further classified by subtype. The subtypes may include one or more of a scheduling subtype, a prescription subtype, and/or other subtypes. For example, a scheduling service may be categorized as a services type asset of the scheduling subtype. A drug prescription service may be categorized as a services type asset of the prescription subtype.

In some implementations, a services type asset may specify one or more resource type assets involved in a service. For example, scheduling a patient for surgery may specify one or more of a particular surgeon (a resource type asset of the personnel subtype), a particular operating room (a resource type asset of the facility subtype), a time, a date, and/or other information. Further, assigning a prescription to a patient may specify the prescribing doctor (a resource type asset of the personnel subtype), the drug being prescribed (a resource type asset of the depletable resource subtype), and/or other information.

In some implementations, message content may be represented in a variety of formats (e.g., medical record formats). Healthcare entity's may utilize their own custom format. The customizations may be directed one or both of the representation of message content in individual messages and/or the location of message content in individual messages. A transformation may be applied to the message content to transform the message content to a healthcare entity-independent format. The transformation may be applied prior to ascertaining the events described in the messages, the subjects involved in the events, and/or the assets involved in the events. The healthcare entity-independent format may represent the message content in a standardized, consistent, manner. The message content in the healthcare entity-independent format may be found in the same place regardless of the source of the information (e.g., regardless of the healthcare entity customizations), making ascertaining the information included therein more streamline.

As is illustrated in FIG. 1, system 100 may include one or more of: one or more servers 102, one or more client computing platforms 124, one or more healthcare entities 126, one or more vendor entities 128, and/or other components. Users may interact with system 100 via one or more client computing platforms 124. The one or more servers 102 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, and/or other client computing platforms.

The one or more servers 102 may include one or more physical processors 104 (also referred to herein as "one or more processors" and/or "processor(s)"), non-transitory electronic storage 119, and/or other components. The one or more physical processors 104 may be configured to execute machine-readable instructions 106. The machine-readable instructions 106 may include one or more computer program components. The computer program components may include one or more of a message component 108, a transformation component 110, an extraction component 112, a storage component 114, a query component 116, a results component 118, and/or other components.

The electronic storage 119 may include electronic storage media that electronically stores information. The electronic storage media of electronic storage 119 may include one or both of system storage that is provided integrally (i.e., substantially non-removable) with one or more servers 102 and/or removable storage that is removably connected to one or more servers 102. The connection may be facilitated by, for example, a port (e.g., a USB port, a firewire port, etc.) or a drive (e.g., a disk drive, etc.). The electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). The electronic storage 119 may store software algorithms, information determined by processor(s) 104, information received by one or more servers 102, information received by client computing platforms 124, and/or other information that enables one or more servers 102 to function as described herein.

The electronic storage 119 may be configured to store one or more of correspondence information, information records, and/or other information. The information records may include one or more of electronic health records, configuration records, event records, subject records, asset records, and/or other records.

Correspondence information may specify correspondences between the healthcare entities and the (customized) medical record formats of the healthcare entities. The correspondences may include past and/or current correspondences between medical record formats and healthcare entities. The correspondences may be used to determine medical record formats of messages being transmitted by healthcare entities.

The healthcare entities may store and/or communicate healthcare information. The healthcare information may be stored and/or communicated in different formats (e.g., medical record formats) for different healthcare entities. Individual healthcare entities may be associated with different medical record formats such that an individual healthcare entity may store and/or communicate information in a format associated with that individual healthcare entity. As presented herein, medical record formats may be customized by the individual healthcare entities. The medical record formats may follow one or more standards used in the healthcare industry. The customizations may be independent of the standard utilized by a healthcare entity. The various standards may refer to a framework for the exchange, integration, sharing, and/or retrieval of information. For example, the standards may include one or more of Health Level 7 (HL7), EDIFACT, DICOM, X12N, NCPDP, and/or other standards. The standards may be based on past standards, current standards, and/or future standards. For example, HL7 may include different versions such as HL7v2, HL7v3, and/or other HL7 versions. Individual versions of HL7 may be associated with various countries. For example, the standards may include an Australian version of HL7v3, a United Kingdom version of HL7v3, a United States version of HL7v3, and/or other versions of HL7.

Customizations of the medical record formats may be directed the representation of information. Certain information may be represented differently within different custom medical record formats. By way of non-limiting illustration, "Female" may be represented as one or more of "F", "Female", "FEMALE", "W", "Woman", "WOMAN", as an integer (e.g., 1 or 2) that corresponds to a value for male or female, and/or may be represented in others ways within different medical record formats.

Customizations of the medical record formats may be directed the location of information in individual messages. For example, a message may include message content. For different medical record formats, a specific piece of information (e.g., patient sex, patient identifier, etc.) may reside in different locations within a message depending on the medical record format.

In some implementations, individual healthcare entities that may use the same or similar medical record format may have a specific set of variations in common across their customers. Further, individual healthcare entities may have unique variations within their own customizations. As such, simply because HL7 (or other standard) may be associated with and/or used by a first healthcare entity as a standard of practice, it does not necessarily mean that the medical record format of a second healthcare entity, which also uses HL7 (or other standard) in their practice, is the same format as the format used by the first healthcare entity. That is, individual healthcare entities that utilize HL7 (or other standard) as their standard in practice, may individually customize the medical record format that may still be within the guidelines of HL7 (or other standard).

Configuration records may be used to solve the problem of the variations in the locations and/or representations of information within medical record formats of different healthcare entities. For individual healthcare entities, individual configuration records may be stored. The configuration records may include sets of rules, which when applied to a message, may "normalize" or "standardize" the message content into a healthcare entity-independent format. For example, representations of information may be transformed into a common form of the information and/or locations of information may be transformed into common locations. The transformation may still maintain the information in accordance with the guidelines set by one or more standards. Returning to the example of patient sex above, female may be represented differently among different medical record formats. The configuration records may normalize or standardize such differences in representation. Further, where a specific piece of information (e.g., patient sex, patient identifier, etc.) may reside in different locations within the message depending on the medical record format, the configuration records may normalize or standardize such differences in locations to a common location within a "normalized" or "standardized" message.

In some implementations, configuration records (e.g., the set of rules) may use a domain specific language (DSL) to transform the message content of the messages to the healthcare entity-independent format.

The message component 108 of machine-readable instructions 106 may be configured to obtain messages and/or other information communicated from one or more healthcare entities 126 to one or more vendor entities 128 and/or vis versa. The messages may include message content. An individual message may indicate a sending party and one or more receiving parties. By way of non-limiting illustration, an individual message may indicate (e.g., in the message content or elsewhere) a healthcare entity and/or one or more vendor entities. The healthcare entity may be a sending party. The one or more vendor entities may be receiving parties. The message content may define one or more events. An individual event may involve an individual subject and one or more assets of the healthcare entity. The message content of the message may be configured in a medical record format that may be customized by and specific to the healthcare entity.

The transformation component 110 may be configured to transform the message content of the messages from the healthcare entity-specific medical record formats to a healthcare entity-independent format. The transformation component 110 may be configured to determine, from the stored correspondence information and the indications of healthcare entities in the individual messages, the individual medical record formats of the messages. For example, by identifying the sending healthcare entity indicated in the message, transformation component 110 may be configured to perform a look up for what healthcare entity-specific format may be associated with that entity. As discussed above, message content originating from different healthcare entities may vary in format, style, and/or content.

Based on a determination of individual medical record formats of individual messages, transformation component 110 may be configured to transform to the individual messages based on the configuration records for the individual medical record formats. The transformation may including applying the sets of rules associated with the configuration records to the message content of the messages.

Applying the transformation to the message that translates the message content in the message from a medical record format to the healthcare entity-independent format may include parsing the message content into structured objects. The structured objects may include data fields. For example, a structured object may include patient identifiers with data fields including patient ID and a patient ID type. Transforming the structured objects into the healthcare entity-independent format may include applying a set of rules that transforms the data fields from the structured objects into healthcare entity-independent format fields of the healthcare entity-independent format.

The healthcare entity-independent format may include standard "data models" that messages from a healthcare entity and/or application may be normalized to. For example, system 100 may include a "scheduling data model" that may represent how information about patient appointments may be handled. The "scheduling data model" may include a standard way of representing the patient, providers, location, time, and/or other information about the patient appointment. Further, the transformed message content of the messages may be found in the same location within the healthcare entity-independent format, regardless of the medical record format that the message originated in. Other data models are contemplated.

The extraction component 112 may be configured to ascertain, from the message content of the messages transformed into the healthcare entity-independent format, individual events defined in the message content of the messages. Ascertaining the events may include one or more of ascertaining what an event itself may be, the individual subjects involved in the individual events, the one or more assets involved in the individual events, and/or other information. By way of non-limiting illustration, the message content may describe what the event is and what is involved (e.g., which assets and/or subjects). For example, a message for scheduling a patient for surgery may include a patient identifier, a schedule identifier if a schedule has already been generated for the patient or information sufficient to generate (e.g., create) a schedule for the patient, what is to happen with the schedule (in this case, surgery is being added to the schedule), what assets are being utilized (e.g., the surgeon, the operating room, tools, drugs, etc.), and/or other information.

The storage component 114 may be configured to effectuate storage (via electronic storage 119) of information records. The information records may include one or more of event records, subject records, asset records, and/or other records.

The event records may define status of individual events ascertained from individual messages. The subject records may define status of individual subjects of the individual events. The asset records may define status of individual assets of the individual events. The statuses of individual ones of the individual events, the individual subjects of the individual events, and/or the individual assets of the individual events may be determined from the message content of the messages.

The statuses of individual ones of the individual events, the individual subjects of the individual events, and/or the individual assets of the individual events may include qualitative descriptions concerning the events, asset, and/or subjects gleaned from the messages. A qualitative description may include information that describes an event, subject, and/or asset for the purpose of one or more of its identity, conveying its use (as described in the message), its intended use (as described in the message and/or inferred from the message), and/or other information that generally reflects a status of the event, subject, and/or asset. An identification of one or more of event, subject, and/or asset may generally include information describing what the event, subject, and/or asset is. A description of the use of one or more of event, subject, and/or asset may include information about a specific use described or set forth in a message. This may include describing one or more of people involved, locations involved, items involved, and/or other information. A description of an intended use of one or more of event, subject, and/or asset may include information about a specific use that may be inferred from information in a message.

By way of non-limiting illustration, a message may include an event of scheduling a patient for surgery. The message may specify one or more of the patient name (or other identifier), the type of surgery, a time, a date, a particular surgeon (a resource type asset of the personnel subtype), a particular operating room (a resource type asset of the facility subtype), and/or other information. The content of the message may facilitate determining statuses of individual ones of the patient, the patient's scheduled, the operating room, the surgeon, and/or other asset and/or entity for the purpose of generating information records.

A subject record may be generated for patient included in the message of the above example. The subject record for the patient may include a status that reflects information about the patient. By way of non-limiting illustration, the status of the patient may include one or more of where the patient is with respect to a current course of treatment (e.g., "scheduled for surgery"), changes to identifying information (if any), and/or other information.

An asset record may be generated for the patient's schedule, which is a services type asset of the scheduling subtype. The asset record for the patients schedule may have a status that reflects the patient' name, the type of surgery, the time, the date, the surgeon, the operating room, and/or other information.

Further, an asset record may be generated for the operating room, which is a resource type asset of the facility subtype. The status for the operating room reflected in that asset record may specify that it is going to be occupied for surgery at the given time and/or date.

An event record may be generated which reflects the status of the event of scheduling the surgery (e.g., adding it to the schedule). The event record may reflect that the schedule for the patient (e.g., the services type asset of the scheduling subtype) has had an item (e.g., the surgery) "added" to it. The event record may be updated to have a different status if other events occur. The other events may include one or more of canceling the surgery and/or modifying the surgery. For a cancelation, the event record may define the status as "canceled." For a modification such as a change to a different room, the event record may define the status as "modified based on operating room."

A change in the status of an event may also be reflected in other records. By way of non-limiting example, in light of a cancelation, the asset record for the patients schedule may be deleted all together (if that was the only item on their schedule), or information for that particular surgery may be removed from the schedule. By way of non-limiting example, in light of a cancelation, the asset record for the operating room may be changed to indicate "unoccupied" on that date and/or time.

It is noted that the above example of generating information records based on a message related to scheduling for surgery is provided for illustrative purposes only and is not to be considered limiting. For example, the manner in which status of events, subjects, and/or assets are determined from messages may be applied messages serving other purposes. The other purposes may include one or more of prescribing drugs, carrying out other treatment related tasks (getting an X-ray, for example), settling insurance claims, administrative tasks (e.g., billing, name changes, address changes, etc.) and/or other purposes within the scope of subjects involvement with healthcare entities.

The query component 116 may be configured to obtain, via individual client computing platforms of one or more client computing platform 124, search queries for information in the information records stored in electronic storage 119. Individual search queries may specify one or more of a specific event, a specific subject, a specific asset, and/or other information.

The query component 116 may be configured to effectuate presentation of search interfaces on one or more client computing platforms 124. A search interface may include one or more interface elements. The interface elements may facilitate user interaction with the search interface. The interface elements may facilitate user input into the search interface. By way of non-limiting illustration, the interface elements may include one or more of text input fields, virtual buttons, check boxes, drop down menus, and/or other elements. In some implementations, a user may input (e.g., type) search queries into a text input field.

Figure 3:
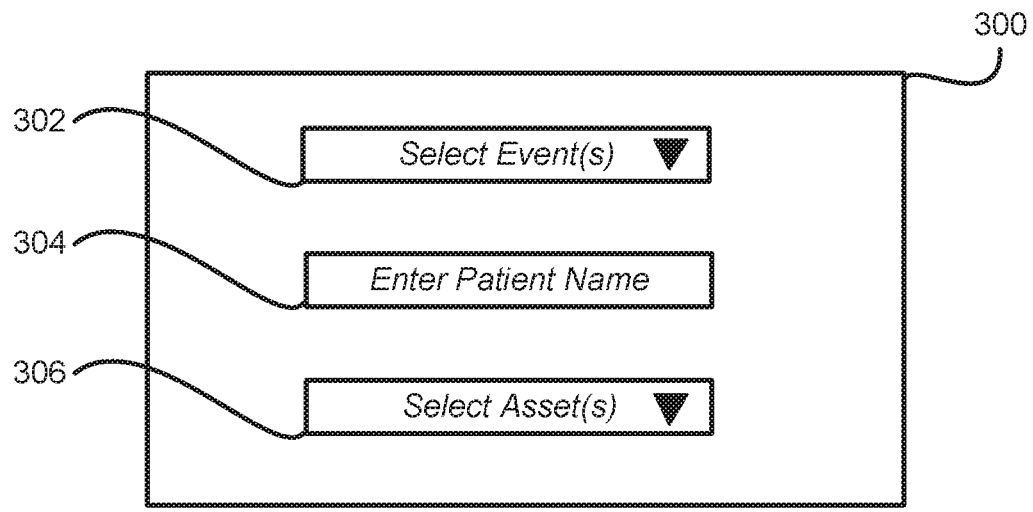
FIG. 3 illustrates a search interface.

By way of non-limiting illustration, FIG. 3 shows an exemplary search interface 300. The search interface 300 may include one or more interface elements and/or other components. The one or more interface elements may include one or more of a first element 302, a second element 304, a third element 306, and/or other elements. The first element 302 may be configured to receive user entry and/or selection of events as a search query for the purpose of searching event records. The first element 302 may include a drop-down menu and/or other interface elements. The second element 304 may be configured to receive user entry and/or selection of patient names as a search query for the purpose of searching subject records. The second element 304 may include a text input field and/or other interface elements. The third element 306 may be configured to receive user entity and/or selection of assets as a search query for the purpose of searching asset records. The third element 306 may include a drop down menu and/or other interface elements.

It is noted that the depiction of search interface 300 in FIG. 3 is for illustrative purposes only and not to be considered limiting. For example, interface elements and/or the manner in which search queries may be entered may be represented in other forms.

Returning to FIG. 1, query component 116 may be configured to search the information records for one or more information records that satisfy the search queries. An information record may satisfy a search query based on one or more of the information record matching the search query, the information record referencing the search query, and/or other criteria. By way of non-limiting illustration, if a search query specifies a specific event, subject, and/or asset, then the corresponding event record, subject record, and/or asset records, respectively, that matches the search query may be determined to satisfy the search query. By way of non-limiting illustration, if a search query specifies a specific event, subject, and/or asset, then an one or more of an event record, subject record, and/or asset records, respectively, that includes and/or references the search query may be determined to satisfy the search query. For example, in some instances, an event defined in a message may cause multiple information records to be generated and/or updated. Accordingly, if a search query matches at least one of the information records, then the some or all of the multiple information records may be determined to satisfy the search query.

The results component 118 may be configured effectuate presentation of results of the search of the information records on one or more computing platforms. The results may include the information included in the information records determined to satisfy the search queries. For example, the results may include the status of one or more of a specific event, a specific subject, a specific asset, and/or other information specified in the individual information records determined to satisfy the individual search queries.

The results component 118 may be configured to effectuate presentation of results interfaces on one or more client computing platforms 124. A results interface may include one or more interface elements. The interface elements may facilitate presentation of information records, user interaction with the information records (e.g., further refining of searching and/or presentation of information), and/or other user interaction with the results interface. By way of non-limiting illustration, the interface elements may include one or more of windows, pages, display, and/or other elements.

Figure 4:
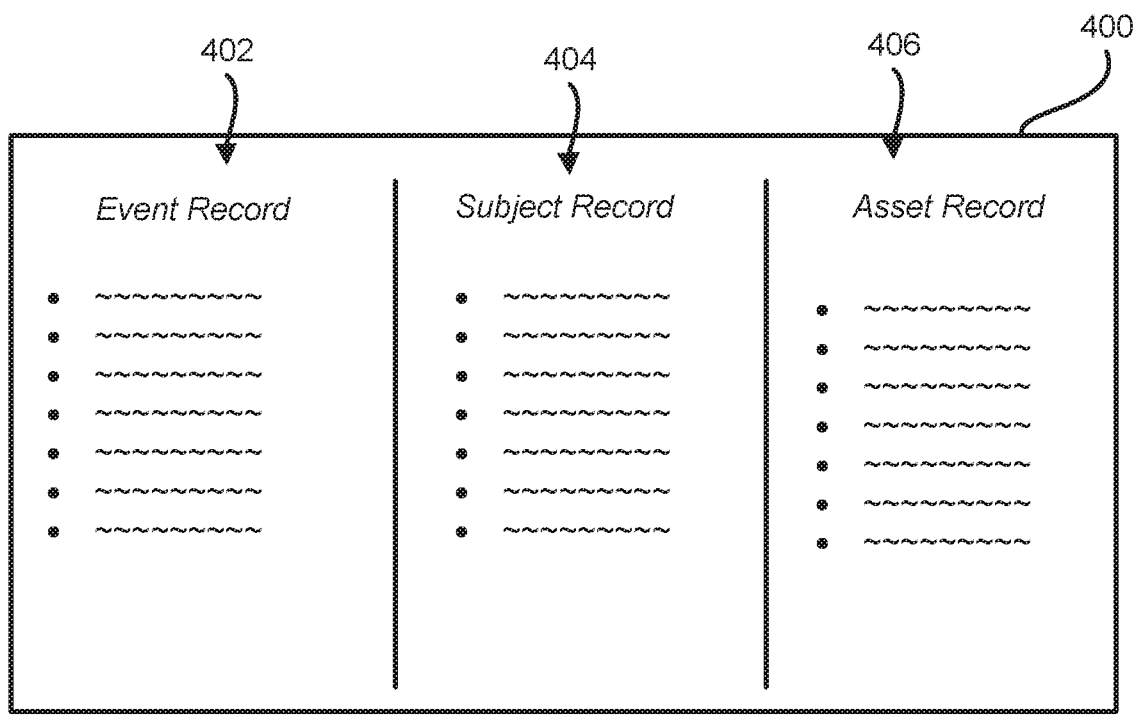
FIG. 4 illustrates a results interface.

By way of non-limiting illustration, FIG. 4 shows an exemplary results interface 400. The results interface 400 may include one or more interface elements and/or other components. The one or more interface elements may include one or more of a first element 402, a second element 404, a third element 406, and/or other elements. The first element 402 may be configured to present information included in one or more event records satisfied by a search query. The first element 402 may include a window, a page, and/or other interface elements configured to present information. The second element 404 may be configured to present information included in one or more subject records satisfied by a search query. The second element 404 may include a window, a page, and/or other interface elements configured to present information. The third element 406 may be configured to present information included in one or more asset records satisfied by a search query. The third element 406 may include a window, a page, and/or other interface elements configured to present information.

It is noted that the depiction of results interface 400 in FIG. 4 is for illustrative purposes only and not to be considered limiting. For example, interface elements and/or the manner in which information included in information records may be presented in other forms.

Returning to FIG. 1, in some implementations, one or more servers 102, one or more client computing platforms 124, one or more healthcare entities 126, one or more vendor entities 128, and/or external resource(s) 122, may be operatively linked via one or more electronic communication links. For example, such electronic communication links may be established, at least in part, via a network 120 such as the Internet and/or other networks. It will be appreciated that this is not intended to be limiting, and that the scope of this disclosure includes implementations in which one or more servers 102, one or more client computing platforms 124, one or more healthcare entities 126, one or more vendor entities 128, and/or external resource(s) 122, may be operatively linked via some other communication media.

The external resource(s) 122 may include sources of information, external entities participating with system 100, and/or other resources. In some implementations, some or all of the functionality attributed herein to external resource(s) 122 may be provided by resources included in system 100.

The one or more servers 102 may include communication lines, or ports to enable the exchange of information with a network and/or other computing platforms. Illustration of one or more servers 102 in FIG. 1 is not intended to be limiting. One or more servers 102 may include a plurality of hardware, software, and/or firmware components operating together to provide the functionality attributed herein to one or more servers 102. For example, one or more servers 102 may be implemented by a cloud of computing platforms operating together as one or more servers 102.

Processor(s) 104 may be configured to provide information processing capabilities in one or more servers 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. The processor(s) 104 may be configured to execute computer readable instruction components 108, 110, 112, 114, 116, 118, and/or other components. The processor(s) 104 may be configured to execute components 108, 110, 112, 114, 116, 118, and/or other components by software; hardware; firmware; some combination of software, hardware, and/or firmware; and/or other mechanisms for configuring processing capabilities on processor(s) 104.

It should be appreciated that although components 108, 110, 112, 114, 116, and/or 118 are illustrated in FIG. 1 as being co-located within a single processing unit, in implementations in which processor(s) 104 includes multiple processing units, one or more of components 108, 110, 112, 114, 116, and/or 118 may be located remotely from the other components. The description of the functionality provided by the different components 108, 110, 112, 114, 116, and/or 118 described herein is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 104 may be configured to execute one or more additional components that may perform some or all of the functionality attributed herein to one of components 108, 110, 112, 114, 116, and/or 118.

Figure 2:
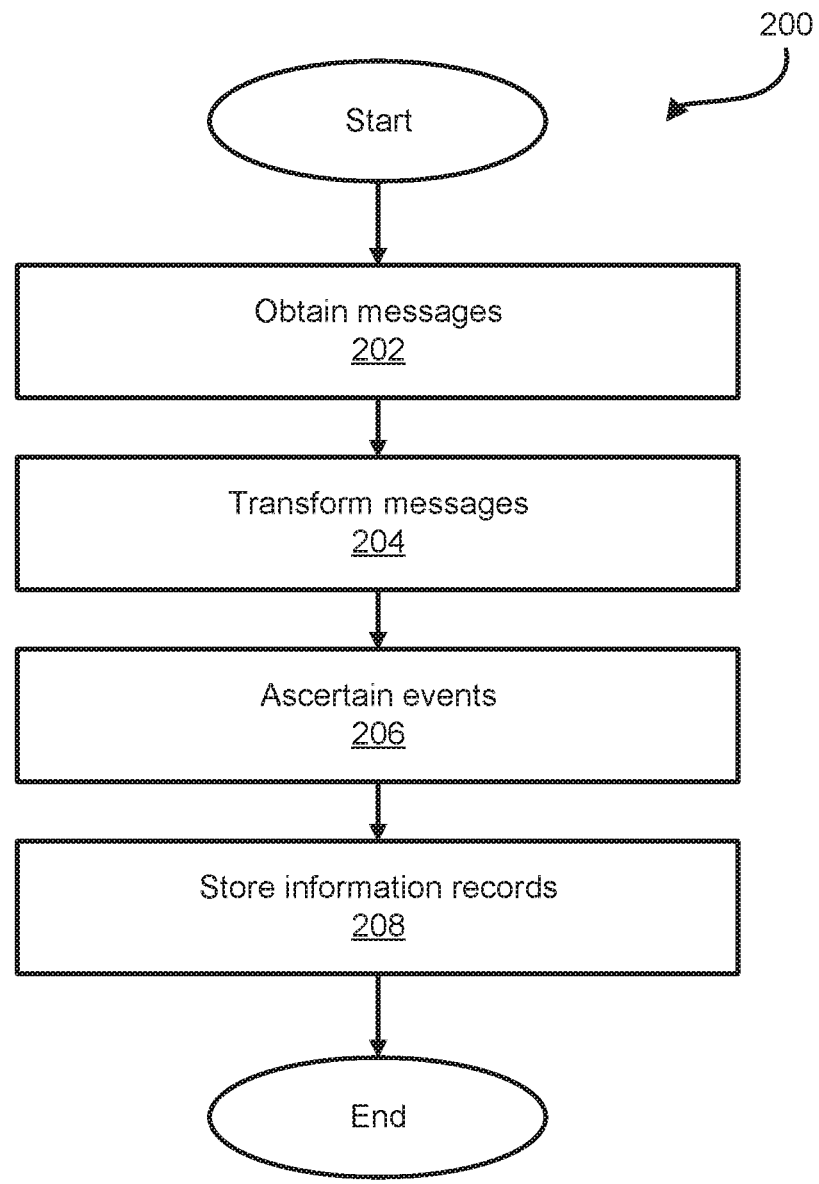
FIG. 2 illustrates a method to facilitate storage and/or retrieval of healthcare information, in accordance with one or more implementations.

FIG. 2 illustrates a method 200 for translating messages that include medical record content between a healthcare entity and a vendor entity, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, messages communicated from a healthcare entity may be obtained. Individual messages may include message content. The message content of an individual message may define one or more events. An individual event may involve an individual subject and one or more assets of the healthcare entity. The message content of the individual message may be configured in a medical record format The medical record format may be specific to the healthcare entity. In some implementations, operation 202 may be performed by one or more physical processors executing a message component that is the same as or similar to message component 108 (shown in FIG. 1 and described herein).

At an operation 204, the message content of the messages may be transformed from the medical record format to a healthcare entity-independent format. In some implementations, operation 204 may be performed by one or more physical processors executing a transformation component that is the same as or similar to transformation component 110, in accordance with one or more implementations.

At an operation 206, individual events defined in the message content of the messages may be ascertained from the message content of the messages in the healthcare entity-independent format. This may include ascertaining the individual subjects and/or the one or more assets involved in the individual events. In some implementations, operation 206 may be performed by one or more physical processors executing an extraction component that is the same as or similar to extraction component 112, in accordance with one or more implementations.

At an operation 208, storage of information records may be effectuated. The information records may include one or more of event records, subject records, asset records, and/or other records. The event records may define status of individual events. The subject records may define status of individual subjects of the individual events. The asset records may define status of individual assets of the individual events. The statuses of one or more of the individual events, the individual subjects of the individual events, and/or the individual assets of the individual events may be determined from the message content of the messages. In some implementations, operation 208 may be performed by one or more physical processors executing a storage component that is the same as or similar to storage component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate storage and/or retrieval of healthcare information, the system comprising:
one or more physical processors configured by machine-readable instructions to:
obtain messages electronically communicated from a healthcare entity, individual messages including message content, the message content of an individual message defining one or more events, an individual event involving an individual subject and one or more assets of the healthcare entity, the message content of the individual message being configured in a medical record format, the medical record format being specific to the healthcare entity, the messages including:
a first message, the first message including first message content, the first message content defining a first event, the first event involving a first subject and a first asset of the healthcare entity;
transform the message content of the messages from the medical record format to a healthcare entity-independent format;
ascertain, from the message content of the messages in the healthcare entity-independent format, healthcare information, the healthcare information including individual events defined in the message content of the messages, individual subjects involved in the individual events, and the one or more assets involved in the individual events, such that the first subject, the first asset, and the first event involving the first subject and the first asset are ascertained from the first message content of the first message; and
effectuate storage of information records having record structures, individual ones of the information records storing different types of the healthcare information ascertained from the message content of the messages, the individual ones of the information records being separate from one another such that the individual ones of the information records are treated as individual units of information, the information records including event records, subject records, and asset records, wherein the event records, the subject records, and the asset records are separate records that store the different types of the healthcare information ascertained from the message content of the messages, such that the event records store the healthcare information including the individual events which includes status of the individual events, the subject records store the healthcare information including the individual subjects which includes status of the individual subjects of the individual events, and the asset records store the healthcare information including individual assets which includes status of the individual assets of the individual events, wherein statuses of the individual events, the individual subjects of the individual events, and the individual assets of the individual events are determined from the message content of the messages, the information records including:

a first event record, the first event record storing status of the first event determined from the first message content of the first message;

a first subject record, the first subject record storing status of the first subject determined from the first message content of the first message; and a first asset record, the first asset record storing status of the first asset determined from the first message content of the first message;

wherein the first event record, the first subject record, and the first asset record are separate records.

2. The system of claim 1, wherein the one or more physical processors are further configured by the machine-readable instructions to:

obtain search queries, individual search queries specifying one or more of a specific event, a specific subject, or a specific asset, the search queries including a first search query, the first search query specifying one or more of the first event, the first subject, or the first asset;

search the information records for one or more of the information records that satisfy the search queries, including searching the first event record, the first subject record, and the first asset record; and effectuate presentation of results of the search of the information records on one or more computing platforms, the results including the status of one or more of the specific event, the specific subject, or the specific asset specified in the individual search queries, such that responsive to searching the first event record, the first subject record, and the first asset record based on the first search query, the status of one or more of the first event, the first subject, or the first asset is presented on a first computing platform.

3. The system of claim 1, wherein an asset is an offering that the healthcare entity provides to its patients.

4. The system of claim 3, wherein the asset is of one or more asset types, an asset type including one or more of a resource type or a services type, wherein the resource type asset includes physical resources available within the healthcare entity, and the services type asset includes intangible services available within the healthcare entity.

5. The system of claim 1, wherein an event includes a transaction or exchange that describes a subject's involvement with one or more healthcare entities for the purpose of treating the subject.

6. The system of claim 1, wherein the messages communicated from the healthcare entity are communicated to one or more third party vendor entities.

7. The system of claim 1, wherein the medical record format is specific to the healthcare entity by virtue of the medical record format being customized by the healthcare entity.

8. The system of claim 7, wherein the customization is directed one or both of representation of information in the message and/or location of information within the messages.

9. The system of claim 8, wherein the customization is independent of a standard of exchange, integration, sharing, and/or retrieval of information utilized by the healthcare entity.

10. The system of claim 1, wherein transformation of the message content of the messages is performed by parsing the message content into structured objects including data fields, and applying a set of rules that is specific to the medical record format of the healthcare entity, wherein applying the set of rules transforms the data fields into the healthcare entity-independent format.

11. A method to facilitate storage and/or retrieval of healthcare information, the method comprising:

obtaining messages electronically communicated from a healthcare entity, individual messages including message content, the message content of an individual message defining one or more events, an individual event involving an individual subject and one or more assets of the healthcare entity, the message content of the individual message being configured in a medical record format, the medical record format being specific to the healthcare entity, including obtaining:

a first message, the first message including first message content, the first message content defining a first event, the first event involving a first subject and a first asset of the healthcare entity;

transforming the message content of the messages from the medical record format to a healthcare entity-independent format;

ascertaining, from the message content of the messages in the healthcare entity-independent format, healthcare information, the healthcare information including individual events defined in the message content of the messages, individual subjects involved in the individual events, and the one or more assets involved in the individual events, including ascertaining the first subject, the first asset, and the first event involving the first subject and the first asset from the first message content of the first message; and effectuating storage of information records having record structures, individual ones of the information records storing different types of the healthcare information ascertained from the message content of the messages, the individual ones of the information records being separate from one another such that the individual ones of the information records are treated as individual units of information, the information records including event records, subject records, and asset records, wherein the event records, the subject records, and the asset records are separate records that store the different types of the healthcare information ascertained from the message content of the messages, the event records storing the healthcare information including the individual events which includes status of the individual events, the subject records storing the healthcare information including the individual subjects which includes status of the individual subjects of the individual events, and the asset records storing the healthcare information including individual assets which includes status of the individual assets of the individual events, wherein statuses of the individual events, the individual subjects of the individual events, and the individual assets of the individual events are determined from the message content of the messages, including effectuating storage of:

a first event record, the first event record storing status of the first event determined from the first message content of the first message;

a first subject record, the first subject record storing status of the first subject determined from the first message content of the first message; and a first asset record, the first asset record storing status of the first asset determined from the first message content of the first message;

wherein the first event record, the first subject record, and the first asset record are separate records.

12. The method of claim 11, further comprising:
obtaining search queries, individual search queries specifying one or more of a specific event, a specific subject, or a specific asset, including obtaining a first search query, the first search query specifying one or more of the first event, the first subject, or the first asset;
searching the information records for one or more of the information records that satisfy the search queries, including searching the first event record, the first subject record, and the first asset record; and
effectuating presentation of results of the search of the information records on one or more computing platforms, the results including the status of one or more of the specific event, the specific subject, or the specific asset specified in the individual search queries, such that responsive to searching the first event record, the first subject record, and the first asset record based on the first search query, effectuating presentation of the status of one or more of the first event, the first subject, or the first asset on a first computing platform.

13. The method of claim 11, wherein an asset is an offering that the healthcare entity provides to its patients.

14. The method of claim 13, wherein the asset is of one or more asset types, an asset type including one or more of a resource type or a services type, wherein the resource type asset includes physical resources available within the healthcare entity, and the services type asset includes intangible services available within the healthcare entity.

15. The method of claim 11, wherein an event includes a transaction or exchange that describes a subject's involvement with one or more healthcare entities for the purpose of treating the subject.

16. The method of claim 11, wherein the messages communicated from the healthcare entity are communicated to one or more third party vendor entities.

17. The system of claim 11, wherein the medical record format is specific to the healthcare entity by virtue of the medical record format being customized by the healthcare entity.

18. The method of claim 17, wherein the customization is directed one or both of representation of information in the message and/or location of information within the messages.

19. The method of claim 18, wherein the customization is independent of a standard of exchange, integration, sharing, and/or retrieval of information utilized by the healthcare entity.

20. The method of claim 11, wherein the transforming of the message content of the messages is performed by parsing the message content into structured objects including data fields, and applying a set of rules that is specific to the medical record format of the healthcare entity, wherein applying the set of rules transforms the data fields into the healthcare entity-independent format.

* * * * *